US012643439B2

(12) United States Patent
Wei et al.

(10) Patent No.: US 12,643,439 B2
(45) Date of Patent: Jun. 2, 2026

(54) DEVICE FOR PREVENTING MIS-ROTATION AND SEAT

(71) Applicant: Bambino Prezioso Switzerland AG, Steinhausen (CH)

(72) Inventors: Qinrui Wei, Dongguan (CN); Yingzhong Chen, Dongguan (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 180 days.

(21) Appl. No.: 18/262,687

(22) PCT Filed: Jan. 28, 2022

(86) PCT No.: PCT/EP2022/052008
§ 371 (c)(1),
(2) Date: Jul. 24, 2023

(87) PCT Pub. No.: WO2022/162125
PCT Pub. Date: Aug. 4, 2022

(65) Prior Publication Data
US 2024/0083312 A1 Mar. 14, 2024

(30) Foreign Application Priority Data
Jan. 28, 2021 (CN) .......................... 202110118376.2

(51) Int. Cl.
*B60N 2/28* (2006.01)
(52) U.S. Cl.
CPC ......... *B60N 2/2869* (2013.01); *B60N 2/2821* (2013.01)
(58) Field of Classification Search
CPC .................................................. B60N 2/2869
See application file for complete search history.

(56) References Cited

U.S. PATENT DOCUMENTS 6,938,954 B1 9/2005 Hendren et al.
7,481,492 B2 1/2009 Lhomme et al.
(Continued)

FOREIGN PATENT DOCUMENTS

CA 3083394 A1 12/2020
CN 201538348 U 8/2010
(Continued)

OTHER PUBLICATIONS

"First Office Action Issued in Corresponding Taiwan Patent Application No. 113139548", Mailed Date: Jan. 23, 2025, 7 pages.
(Continued)

*Primary Examiner* — David R Dunn
*Assistant Examiner* — Tania Abraham
(74) *Attorney, Agent, or Firm* — Volpe Koenig

(57) ABSTRACT

A device for preventing mis-rotation including: a blocking portion; a mount having a bottom wall, a first side wall and a second side wall configured to form an accommodating space; a stopper pivotally arranged between the side walls and at least partially accommodated in the accommodating space to pivot between a locking position in which the stopper is clamped with and stopped at the blocking portion direction and a releasing position in which the stopper and the blocking portion are released; and a pushing assembly arranged on the bottom wall of the mount and at least partially accommodated in the accommodating space, the pushing assembly being capable of sliding on the bottom wall under an action of external force, so as to pivot the stopper from the locking position to the releasing position.

11 Claims, 15 Drawing Sheets

(56) References Cited

U.S. PATENT DOCUMENTS

| | | | |
|---|---|---|---|
| 2009/0091167 A1 | 4/2009 | Jha et al. | |
| 2014/0008951 A1 | 1/2014 | Spence et al. | |
| 2014/0084650 A1* | 3/2014 | Rabeony | B60N 2/2863 |
| | | | 297/256.12 |
| 2017/0327010 A1 | 11/2017 | Noguchi et al. | |
| 2017/0355287 A1 | 12/2017 | Anderson et al. | |
| 2020/0215941 A1 | 7/2020 | Resch et al. | |
| 2020/0391627 A1 | 12/2020 | Williams | |
| 2023/0014310 A1* | 1/2023 | Longenecker | B60N 2/2806 |
| 2023/0045540 A1* | 2/2023 | Mchugh | B60N 2/2869 |
| 2023/0226957 A1* | 7/2023 | Frank | B60N 2/2869 |
| | | | 297/250.1 |

FOREIGN PATENT DOCUMENTS

| | | | |
|---|---|---|---|
| CN | 102753386 A | 10/2012 | |
| CN | 104602952 A | 5/2015 | |
| CN | 107284299 A | 10/2017 | |
| CN | 107499195 A | 12/2017 | |
| CN | 107585065 A | 1/2018 | |
| CN | 107662525 A | 2/2018 | |
| CN | 107813737 A | 3/2018 | |
| CN | 207274486 U | 4/2018 | |
| CN | 108621880 A | 10/2018 | |
| CN | 109606215 A | 4/2019 | |
| CN | 208813033 U | 5/2019 | |
| CN | 110893805 A | 3/2020 | |
| CN | 111278677 A | 6/2020 | |
| CN | 107499196 B | 9/2020 | |
| CN | 111845485 A | 10/2020 | |
| CN | 112078450 A | 12/2020 | |
| EP | 2308716 A1 | 4/2011 | |
| EP | 3284630 B1 | 6/2013 | |
| EP | 3954576 A1 | 2/2022 | |
| ES | 2551761 T3 | 11/2015 | |
| FR | 2974547 A1 | 11/2012 | |
| JP | H05001579 U | 1/1993 | |
| JP | 2002301964 A | 10/2002 | |
| JP | 2020533232 A | 11/2020 | |
| WO | 2010001884 A1 | 1/2010 | |

OTHER PUBLICATIONS

"First Office Action Issued in Corresponding European Patent Application No. 22702464.3", Mailed Date: Sep. 2, 2024, 3 pages.

Taiwanese Notice of Allowance for Application No. 111102584 dated Oct. 6, 2022.

Taiwanese Office Action for Application No. 112100535 dated Jul. 7, 2023.

International Search Report and Written Opinion for Application No. PCT/EP2022/052008 dated May 9, 2022.

"Notice of Allowance Issued in Corresponding Taiwanese Patent Application No. 113104491", Mailed Date: Jul. 19, 2024, 8 pages.

"Notice of Reasons for Refusal Issued in Corresponding Japanese Patent Application No. 2023-543380", Mailed Date: May 7, 2024, 6 pages.

China National Intellectual Property Administration. Office Action for corresponding application CN 202110118376.2, mailed Jan. 28, 2026. 19 pages. English translation provided.

IP Australia. Office Action for corresponding application AU 2025201753, mailed Mar. 9, 2026. 7 pages.

* cited by examiner

110

120

1

DEVICE FOR PREVENTING MIS-ROTATION AND SEAT

CROSS REFERENCE TO RELATED APPLICATIONS

This application is a 371 U.S. National Phase of International Application No. PCT/EP2022/052008, filed on Jan. 28, 2022, titled "DEVICE FOR PREVENTING MIS-ROTATION AND SEAT," which claims priority to Chinese Patent Application No. 202110118376.2, filed Jan. 28, 2021, titled "DEVICE FOR PREVENTING MIS-ROTATION AND SEAT," the entirety of which are incorporated by reference herein.

TECHNICAL FIELD

The present disclosure relates to a device for preventing mis-rotation and a seat including the device for preventing mis-rotation.

BACKGROUND

Seats are common devices that may be used for babies of different ages. Generally, when the seat is in a forward position, it is used for an older baby, and when the seat is in a backward position, it is used for a younger baby. In some use environments, it is required that the seat may rotate in order to change a direction towards which the user faces. However, after the seat rotates, there will be a possibility of misuse, which may be caused by placing the younger baby onto the seat in the forward position. One of the use environments is a vehicle-mounted child seat, in which a seat body may rotate relative to a base fixed to the vehicle body, so that the seat may be switched between a state in which a backrest faces backwards and a state in which the backrest faces forwards. Therefore, it is necessary to provide a device for preventing mis-rotation to further remind caretakers to pay attention to the correct and safe use of the seat when the seat is turned to the front, and not to place the younger baby onto the seat in the forward position.

For the sake of safety, it is necessary for a rotatable seat to lock the seat with a device for preventing mis-rotation so as to remind the user to avoid the unexpected use of the seat. In order to improve the user experience, the device for preventing mis-rotation needs to be stable, reliable and easy to operate, and its internal structure needs to be hidden to facilitate the neat appearance of the entire seat.

SUMMARY

According to the present disclosure, a device for preventing mis-rotation is connected between a first component and a second component that are relatively rotated, and the device for preventing mis-rotation includes: a blocking portion fixed on the first component; a mount fixed on the second component, the mount having a bottom wall, and a first side wall and a second side wall extending from the bottom wall and facing towards each other, and the bottom wall, the first side wall and the second side wall being configured to form an accommodating space; a stopper pivotally arranged between the first side wall and the second side wall through a pivot shaft and at least partially accommodated in the accommodating space to pivot between a locking position in which the stopper is clamped with and stopped at the blocking portion to prevent the first component from rotating relative to the second component in a rotating direction and a releasing position in which the stopper and the blocking portion are released to allow the first component to rotate relative to the second component in the rotating direction; and a pushing assembly arranged on the bottom wall of the mount and at least partially accommodated in the accommodating space, the pushing assembly being capable of sliding on the bottom wall under an action of external force, so as to pivot the stopper from the locking position to the releasing position.

In one embodiment, the device for preventing mis-rotation further includes a torsion spring sleeved at the pivot shaft, one end of which is fixed to the stopper and the other end of which is fixed to the mount for biasing the stopper to the locking position.

In one embodiment, the pushing assembly includes a driving block slidably arranged in the accommodating space and positioned on the bottom wall of the mount; a push button positioned outside the accommodating space of the mount; and a connector fixedly connects the driving block and the push button together.

In one embodiment, at least one of the first side wall and the second side wall of the mount is provided with an elongated slot along a sliding direction of the driving block, and the connector passes through the elongated slot to fixedly connect the driving block and the push button together, and is capable of sliding along the elongated slot.

In one embodiment, the driving block has a first end and a second end along the sliding direction thereof, and has a protrusion between the first end and the second end; in a height direction perpendicular to the sliding direction, the first end has a gradually increasing height that obliquely transitions to the protrusion, and the second end has a substantially uniform height lower than that of the protrusion; and the connector is in a shape of a folded-rod, one end of which is inserted into the protrusion along a direction perpendicular to the sliding direction and the height direction, and the other end of which is fixed to the push button.

In one embodiment, the blocking member includes a top surface facing away from the bottom wall of the mount and approximately parallel to the bottom wall; and a bottom surface facing towards the bottom wall of the mount and approximately parallel to the bottom wall. The bottom surface of the stopper is provided with a foot protruding outwards, and the pushing assembly pivots the stopper from the locking position to the releasing position by pushing the foot.

In one embodiment, the stopper includes a top surface facing away from the bottom wall of the mount and approximately parallel to the bottom wall; a bottom surface facing towards the bottom wall of the mount and approximately parallel to the bottom wall, in which a foot protruding outwards is arranged at an end of the bottom surface of the stopper; and two side surfaces positioned between the top surface and the bottom surface. In the releasing position, the driving block is positioned at an end of the elongated slot, the foot is positioned at the second end of the driving block, and the top surface of the driving block is opposite to the blocking portion. In the locking position, the driving block is positioned at the other end of the elongated slot, in which the foot is positioned at the first end of the driving block, and one of the two side surfaces of the stopper is clamped with and stopped at the blocking portion.

According to the present disclosure, a seat includes: a base including an annular rail which defines a sliding direction; a pusher connected to the base and slidably inserted in the annular rail; a seat body fixedly connected with the pusher and capable of rotating with the pusher relative to the base; and the device for preventing mis-rotation of any one of claims 1-7 installed between the base and the pusher, the first component being the pusher and the second part being the base.

In one embodiment, the pusher includes a pusher body capable of sliding on the annular rail, and the blocking portion is arranged on the pusher body and extends outward in a radial direction of the annular rail.

In one embodiment, two device for preventing mis-rotations are provided and respectively positioned at both sides of the base, and a toggle link is arranged between the two device for preventing mis-rotations, so that when the pushing assembly of one of the two device for preventing mis-rotations is operated, it drives the pushing assembly of the other of the two device for preventing mis-rotations to operate synchronously.

BRIEF DESCRIPTION OF THE DRAWINGS

Embodiments of the present disclosure will be described in detail below with reference to the accompanying drawings, in which.

LIST OF REFERENCE NUMBERS

100 SEAT
  110 SEAT BODY
  120 BASE
  130 PUSHER
    131 BLOCKING PORTION
  140 MOUNT
    141a FIRST SIDE WALL
    141b SECOND SIDE WALL
    142 SLOT
  150 STOPPER
    151 TOP SURFACE
    152 BOTTOM SURFACE
    153 FOOT
  160 PUSH BUTTON
    161 PUSH BUTTON PLATE
    162 PUSH BUTTON OPERATING PORTION
    163 PUSH BUTTON CONNECTING PORTION
    165 CONNECTOR
  170 DRIVING BLOCK
    171 FIRST END
    172 SECOND END
    173 PROTRUSION
  180 TORSION SPRING
  190 LINKAGE

DETAILED DESCRIPTION

Although the present disclosure is illustrated and described herein with reference to specific embodiments, the present disclosure should not be limited to the details shown. Rather, various modifications can be made to these details within the scope of the equivalents of the claims without departing from the present disclosure.

The description for directions such as "front", "rear", "upper" and "lower" mentioned in the text are only for convenience of understanding, i.e., the present disclosure is not limited to these directions, and can be adjusted according to the actual situations.

Figure 1:
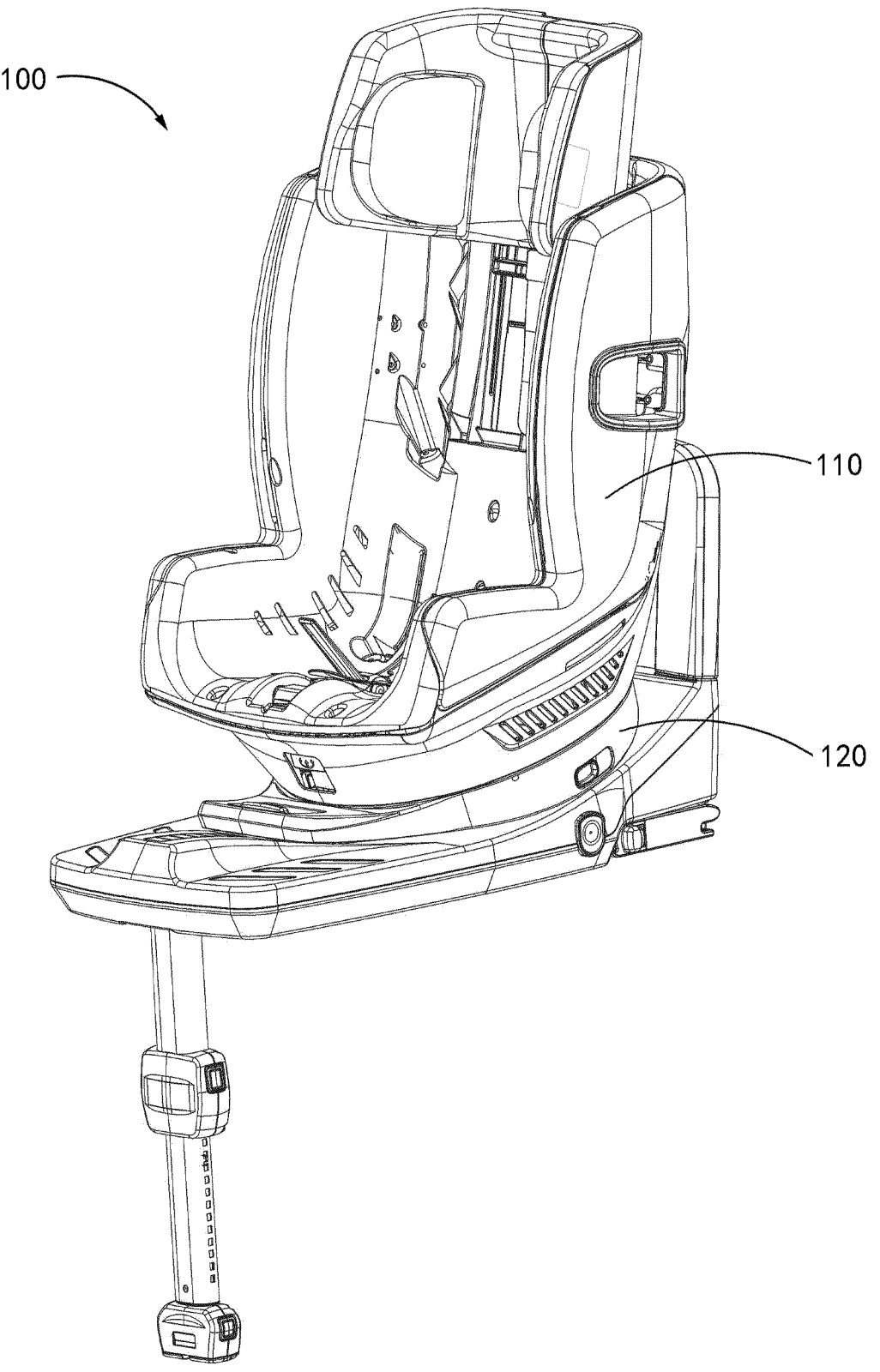
FIG. 1 is a perspective view showing a seat according to the present disclosure, in which a seat body rotates to a forward position.
Figure 2:
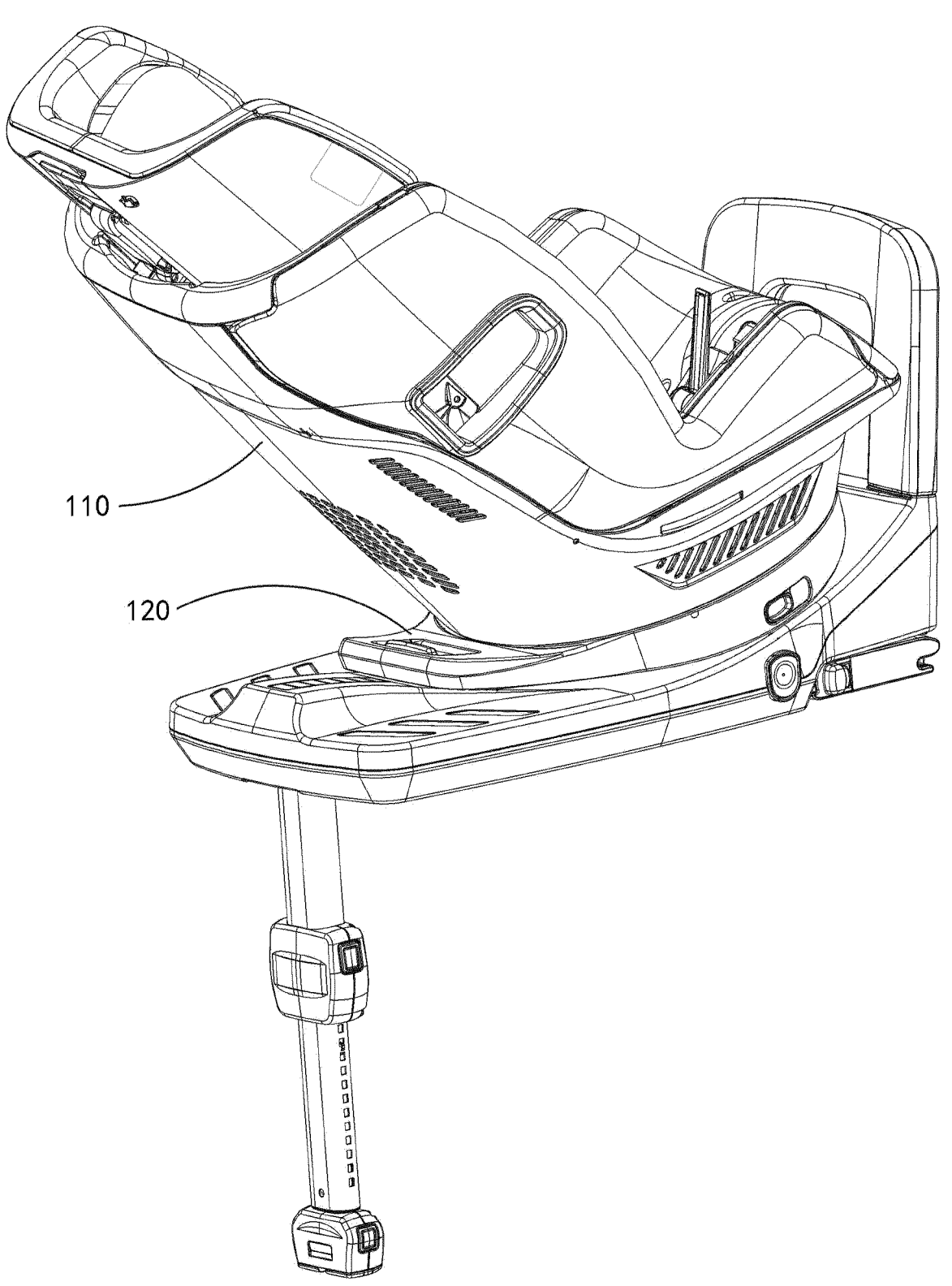
FIG. 2 is a perspective view showing the seat according to the present disclosure from another angle, in which the seat body rotates to a backward position.

Firstly, referring to FIG. 1, FIG. 1 is a perspective view showing a seat 100 according to the present disclosure, in which a seat body 110 rotates to a forward position. As shown, the seat 100 includes a seat body 110 and a base 120. The seat body 110 is rotatably mounted on the base 120 so as to be able to rotate to a forward position (as shown in FIG. 1) and a backward position (as shown in FIG. 2). The base 120 is mounted on a susceptor located below the base 120. In one embodiment, the base 120 may slide forwards and backwards relative to the susceptor, so as to provide more stop locations for the base 120. The susceptor is configured to fix the entire seat 100 to a carrier such as an automobile.

Referring now to FIG. 2, FIG. 2 is a perspective view showing the seat 100 according to the present disclosure from another angle, in which the seat body 110 rotates to a backward position. As shown, compared with the forward position shown in FIG. 1, the seat body 110 has been rotated by 180 degrees relative to the base 120, so that the seat body 110 may reach a backward facing position of the seat body 110 where a chair back is facing forward for a younger baby to use, which may be used for a baby of 0-4 years old. In this way, for example, in the case of sudden deceleration of a moving car, the seat 100 in the backward facing position may alleviate an impact force on the baby in the seat 100, and thus protect the baby. Furthermore, when a rotation axis of the seat body 110 has a certain inclination angle, the seat body 110 in the backward facing position may provide a certain elevation angle, thereby providing a more comfortable riding environment.

Figure 3:
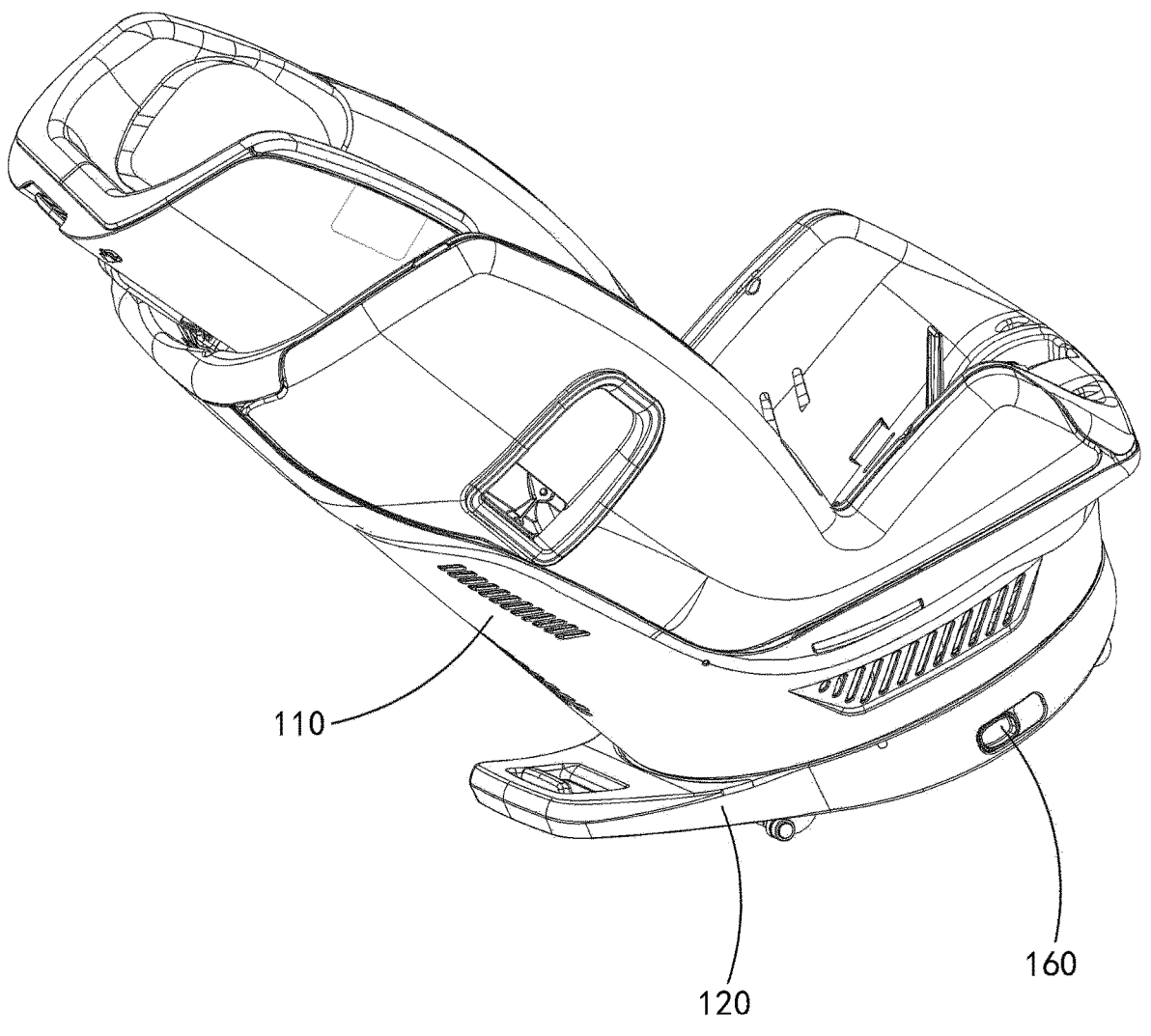
FIG. 3 is a perspective view showing the seat according to the present disclosure from another angle, in which a susceptor below a base is omitted and the seat body rotates to the backward position.

Referring now to FIG. 3, FIG. 3 is a perspective view showing the seat 100 according to the present disclosure from another angle, in which the susceptor located below the base 120 is omitted, and the seat body 110 rotates to the backward position. The positional relationship between the seat body 110 and the base 120 can be seen more clearly from FIG. 3. The push button 160 of a device for preventing mis-rotation may also be seen from FIG. 3. The push button 160 is positioned outside the base 120, and its position is configured to allow the user to rotate the seat body 110 by one hand and operate the push button 160 by the other hand. The user may operate the device for preventing mis-rotation through the push button 160, thereby locking and unlocking the relative rotation between the seat body 110 and the base 120.

In the present disclosure, the push button 160, a driving block 170 and a connector 165 may be collectively referred to as a pushing assembly.

Figure 4:
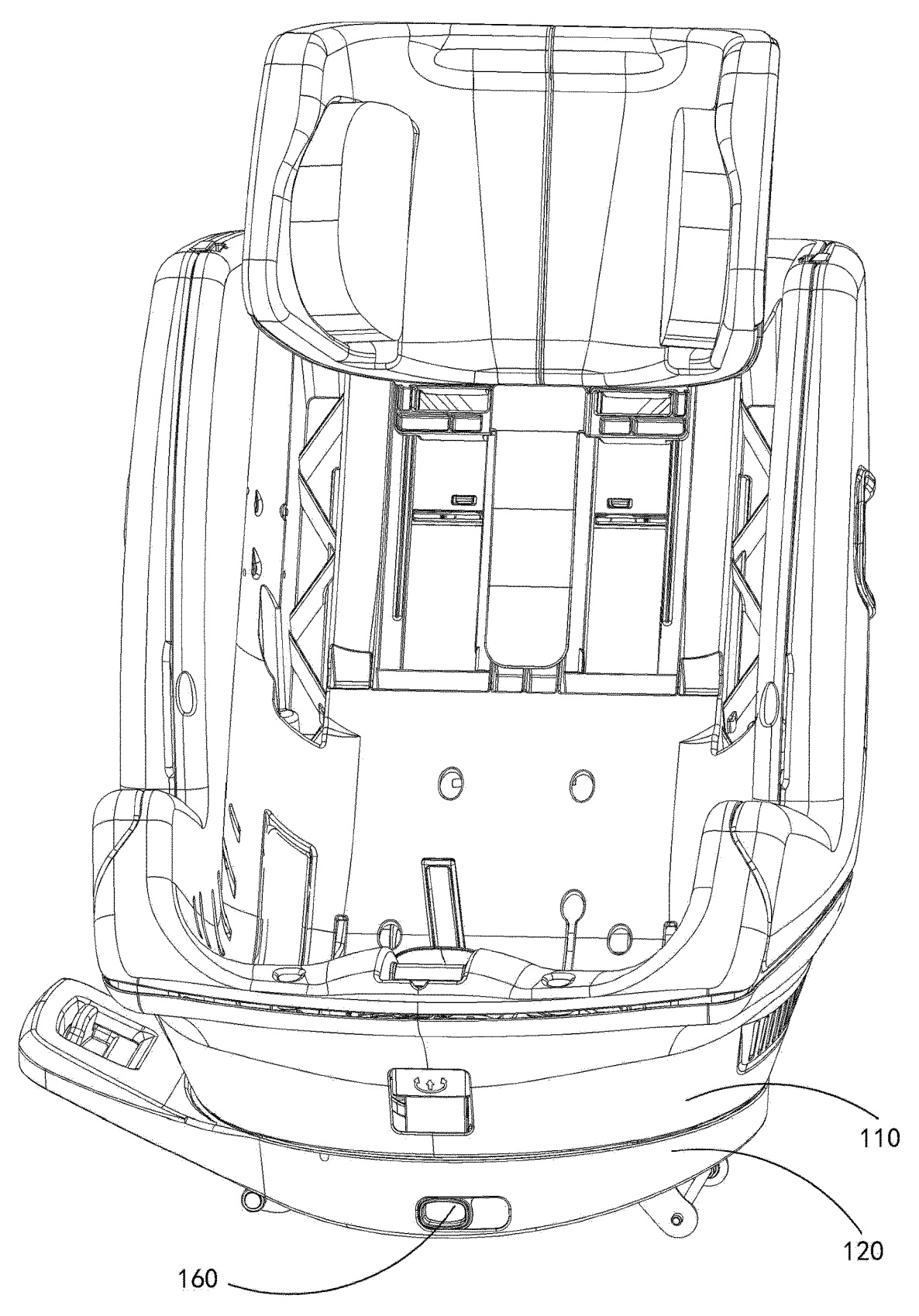
FIG. 4 is a perspective view showing the seat according to the present disclosure from another angle, in which the susceptor below the base is omitted, and the seat body rotates to an intermediate position between the forward position and the backward position.

Referring now to FIG. 4, FIG. 4 is a perspective view showing the seat 100 according to the present disclosure from another angle, in which the susceptor located below the base 120 is omitted, and the seat body 110 rotates to an intermediate position between the forward position and the backward position. At this time, the seat body 110 is substantially transverse to the base 120. The device for preventing mis-rotation according to the present disclosure may be designed to lock the seat 100 at any rotating position. In this embodiment, the device for preventing mis-rotation is shown to be capable of locking the seat body 110 in the forward position and the backward position, however, it should be understood that the present disclosure is not limited to these two locking positions.

Figure 5A:
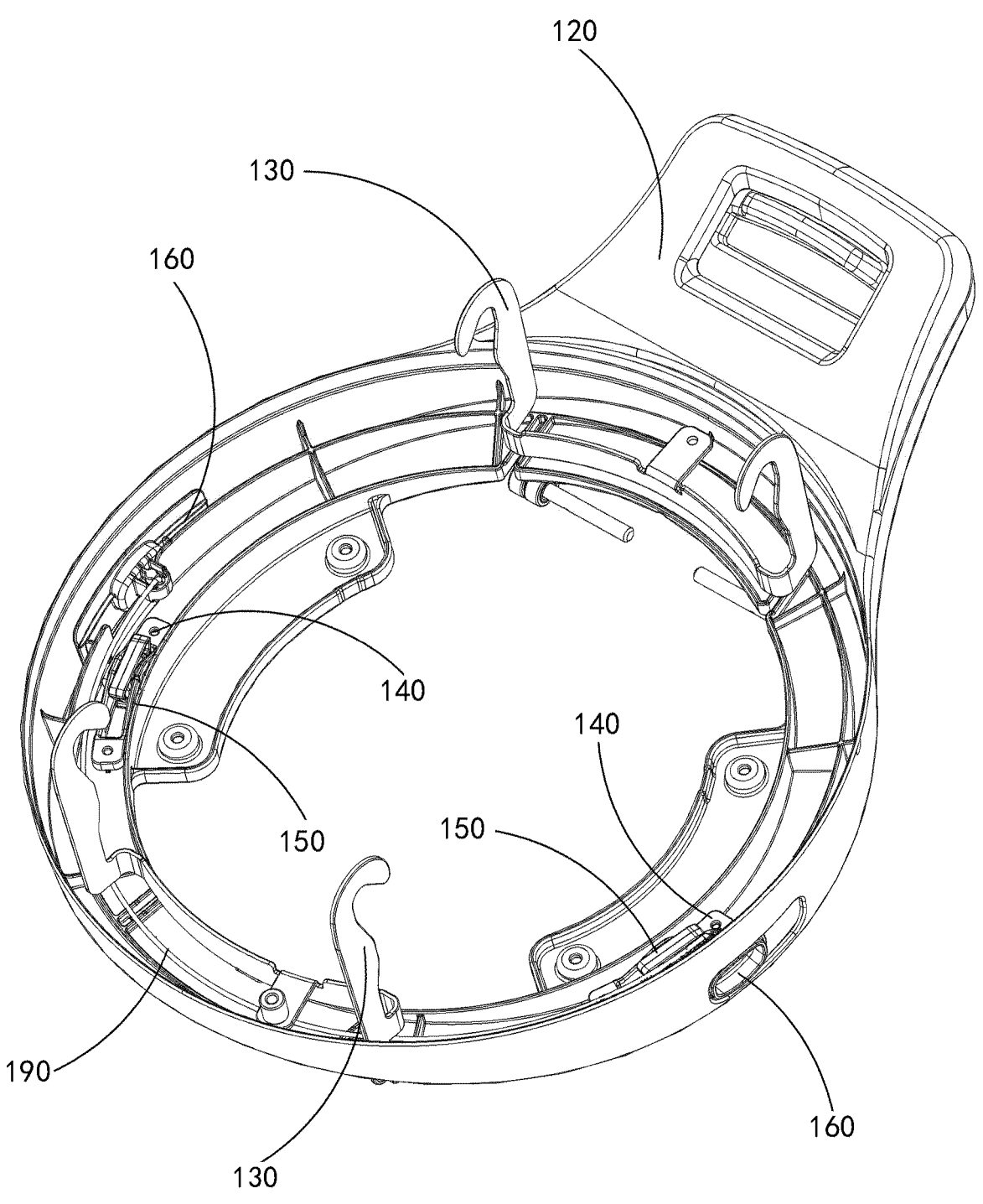
FIGS. 5A and 5B are perspective views showing the base, pushers, mounts, stoppers and push buttons of the seat according to the present disclosure from two different angles, in which the pusher rotates to a position different from the stopper.
Figure 5B:
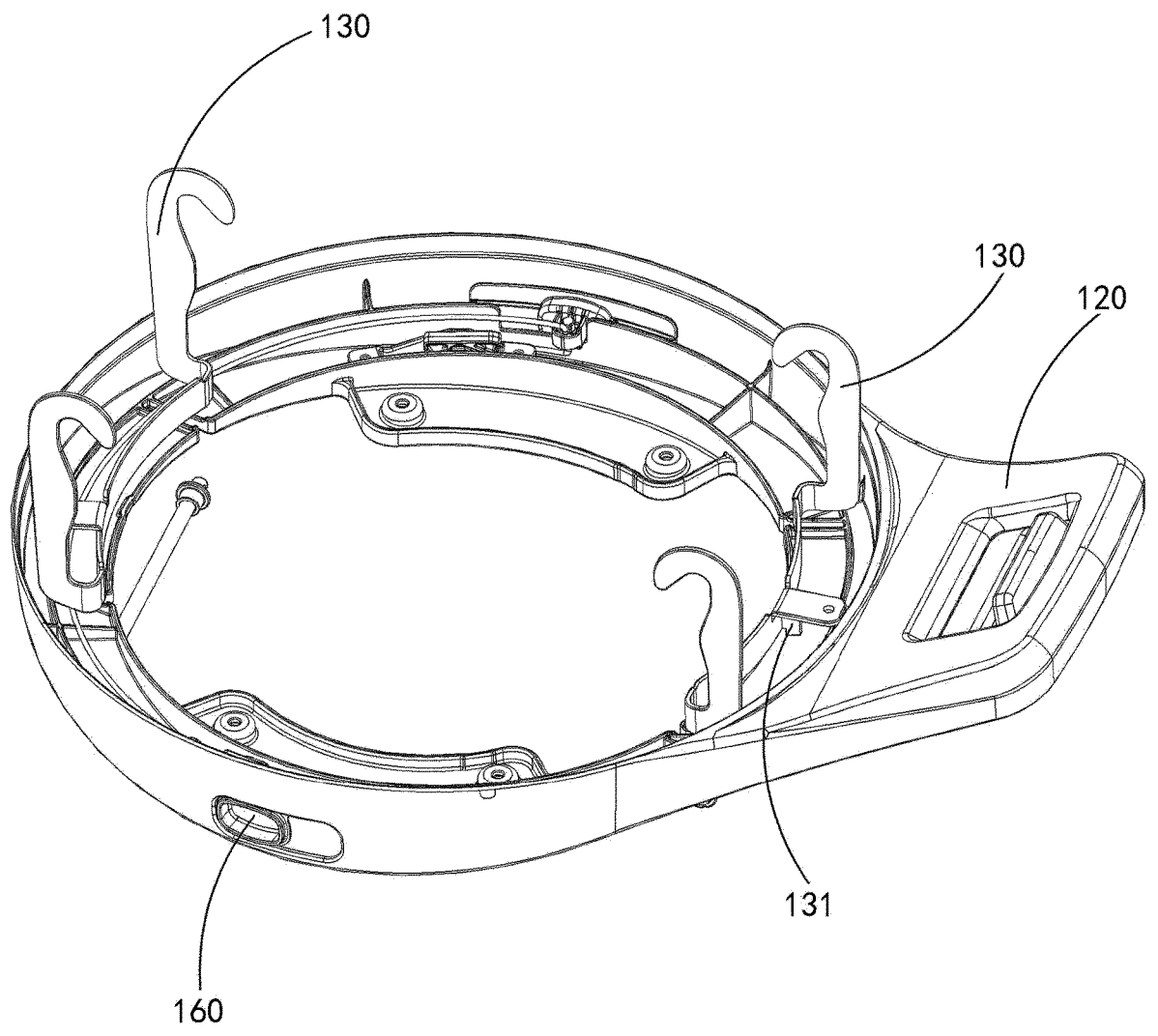

Referring now to FIGS. 5A and 5B, FIGS. 5A and 5B are perspective views showing the base 120, pushers 130, mounts 140, stoppers 150 and push buttons 160 of the seat 100 according to the present disclosure from two different angles, in which the pusher 130 rotates to a position different from the stopper 150.

As shown, the base 120 has an annular rail at a side facing the seat body 110, and the pusher 130 may slide on the annular rail. The pusher 130 is fixedly connected to the seat body 110 and may rotate with the seat body 110 relative to the base 120. In the embodiment as shown, two pushers 130 are uniformly arranged along a circumference of the annular rail, each of the pushers 130 has an arc-shaped portion substantially extending along the annular rail and hooks at both ends of the arc-shaped portion, the arc-shaped portion is inserted into the annular rail to enable the pusher 130 to slide along the annular rail, and the hooks extend towards the seat body 110 and engage the bottom of the seat body 110. It should be understood that the shape and number of the pusher 130 in this embodiment are only exemplary. In other embodiments, one or more pushers 130 may be configured, and the pushers may be evenly distributed or unevenly distributed on the circumference of the annular rail. In other embodiments, the pusher 130 may have different shapes as long as it may be fixedly connected to the seat body 110.

The mount 140 is fixedly mounted to the base 120 so as to provide a structure for mounting components such as the stopper 150. The stopper 150 may be pivotally connected to the mount 140 with a pivot axis generally along a radial direction of the annular rail. In this way, through the pivoting of the stopper 150, an end of the stopper 150 may be lifted towards the seat body 110, thereby interfering with the pusher 130 (specifically, the blocking portion 131 on an annular part of the pusher), and preventing the pusher 130 from sliding along the annular rail when the pusher 130 rotates from rear to front to the position of the stopper 150 (as shown in FIG. 6), which will be described in detail below.

The push button 160 is mounted on the side wall of the base 120, one part of which is exposed to the outside of the seat 100 through an opening on the side wall for the user to operate, and the other part is connected to a driving block 170 (to be described later) in the mount 140, so as to drive the pivoting of the stopper 150 through the driving block 170.

In the embodiment shown, two sets of assemblies including the mount 140, the stopper 150, the push button 160 and the driving block 170 are arranged at regular intervals along the circumference of the annular rail. Furthermore, there is a synchronous linkage device between the two sets of assemblies, so that stoppers 150 in the two sets of assemblies block or do not block the corresponding pushers 130 synchronously. In this way, the user only needs to operate the push button 160 in any set of assemblies, and then may control both sets of assemblies simultaneously. In the embodiment shown, the synchronous linkage device is an annular linkage 190 connected to two push buttons 160, and the linkage 190 extends along the annular rail for about 180 degrees, however, it is not limited to this angle. It should be understood that other forms of synchronous linkage devices may also be used. It should also be understood that the push button 160 may only be provided in one set of assemblies for the user to operate, and all the components may be driven by synchronous linkage between the sets of assemblies.

Figure 6:
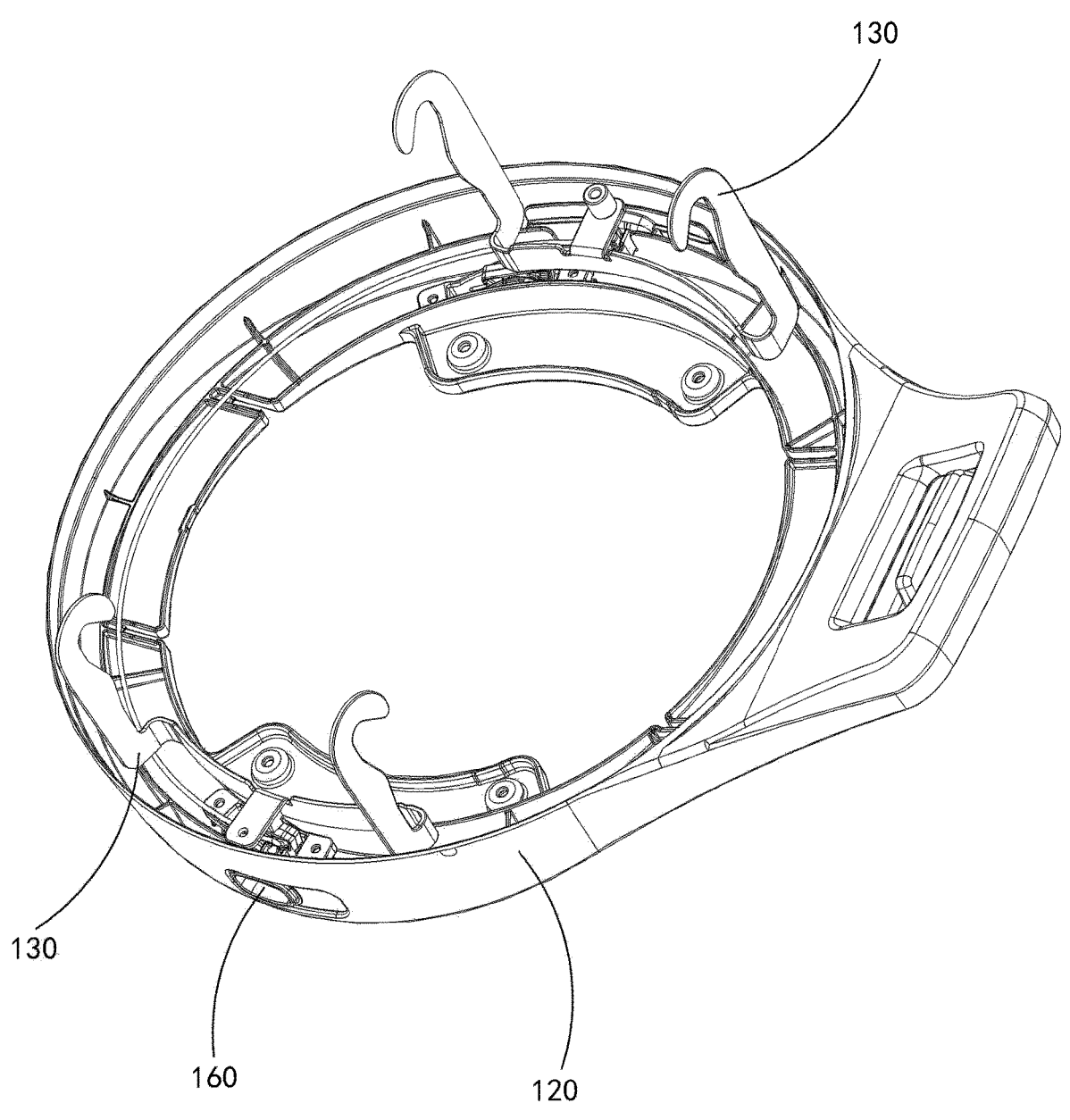
FIG. 6 is a perspective view showing the base, the pushers, the mounts, the stoppers and the push buttons of the seat according to the present disclosure, in which the pusher rotates to a position of the stopper.

Referring now to FIG. 6, FIG. 6 is a perspective view showing the base 120, the pushers 130, the mounts 140, the stoppers 150 and the push buttons 160 of the seat 100 according to the present disclosure, in which the pusher 130 rotates to a position of the stopper 150. In the position shown in FIG. 6, the user may operate the push button 160 to drive the stopper 150, so as to prevent or allow the pusher 130 to slide along the annular rail, thereby preventing or allowing the seat body 110 to rotate relative to the base 120.

Figure 7:
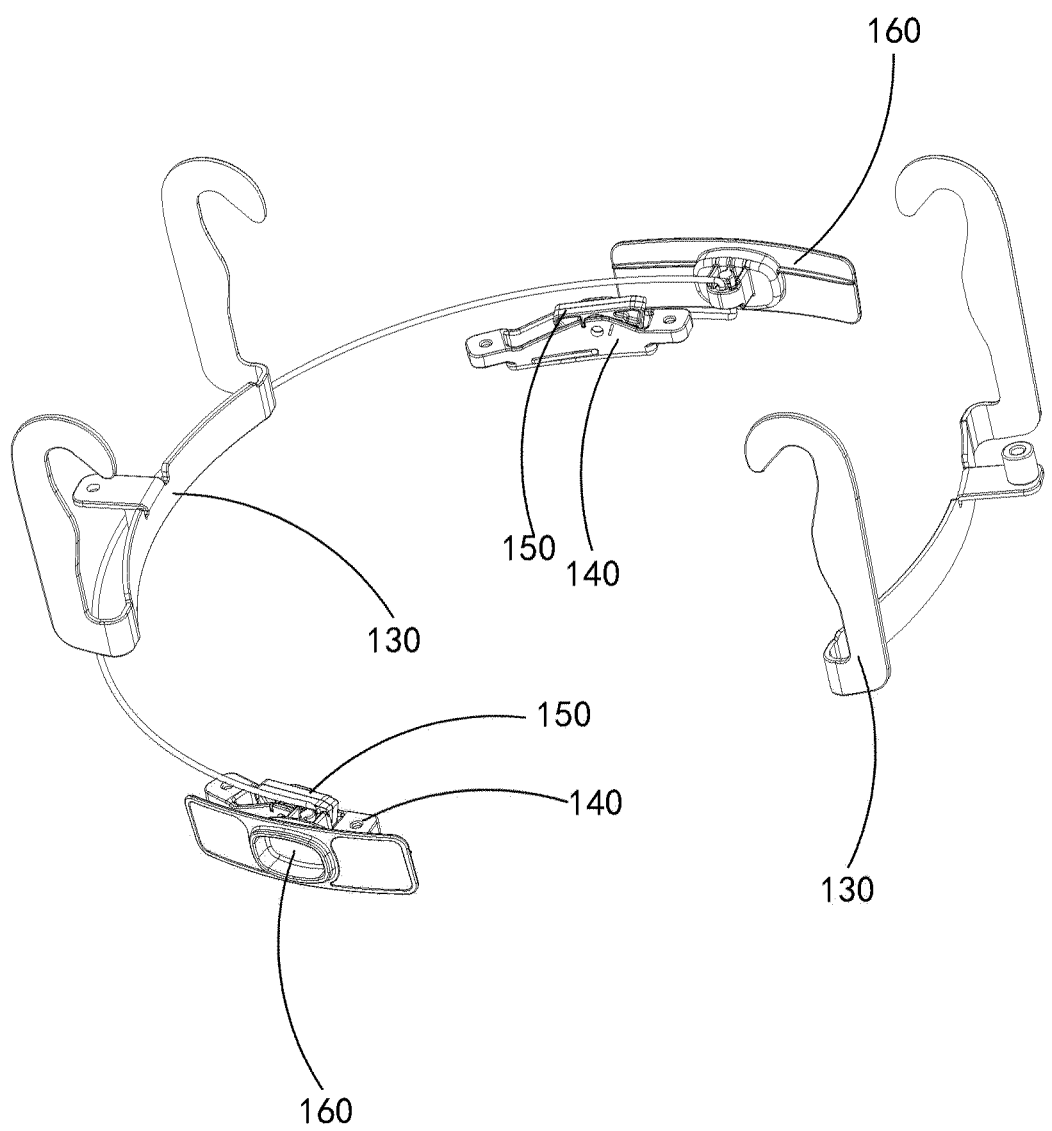
FIG. 7 is a perspective view showing the pushers, the mounts, the stoppers and the push buttons of the seat according to the present disclosure, in which the pusher rotates to the position different from the stopper.
Figure 8:
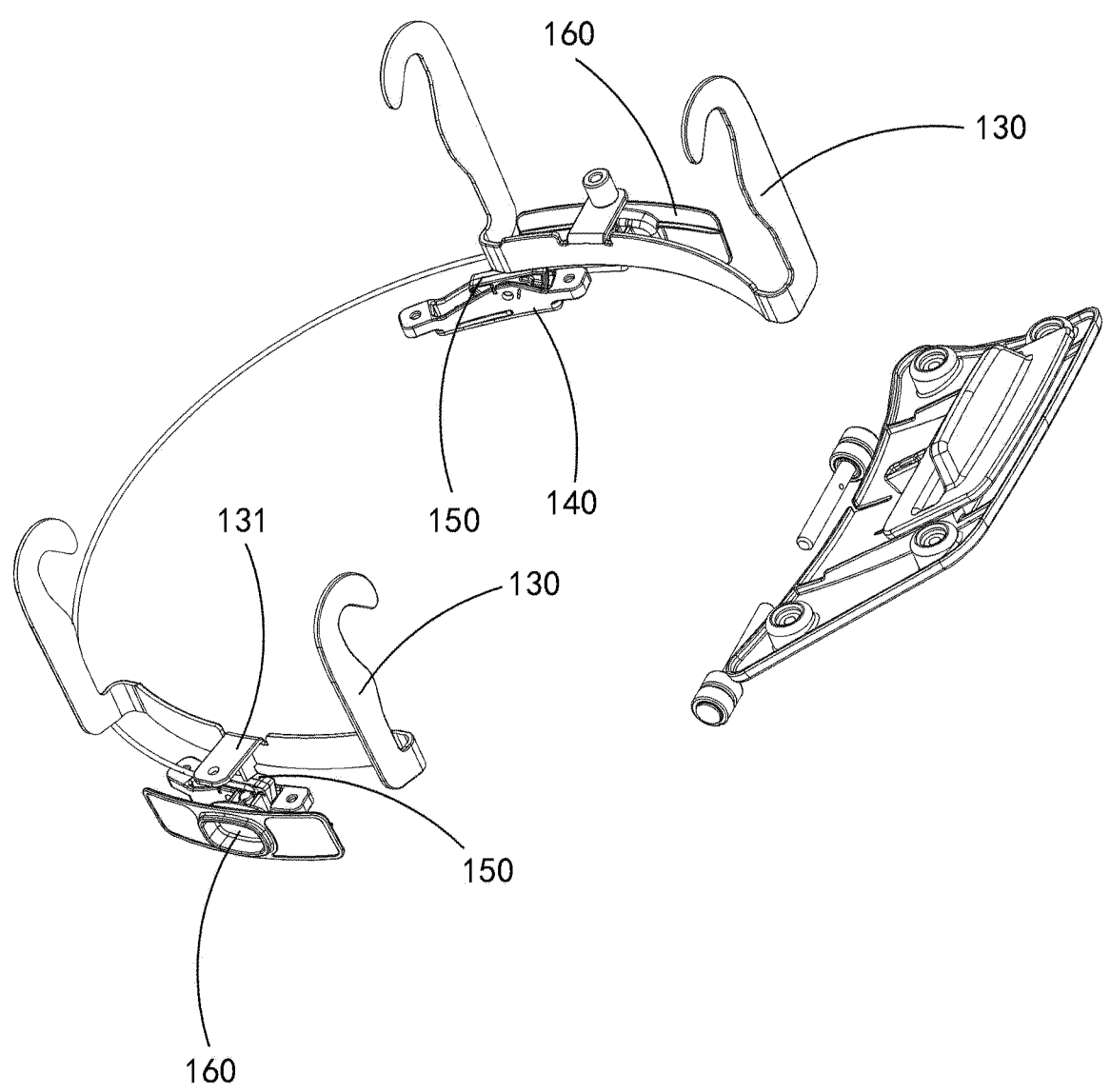
FIG. 8 is a perspective view showing the pushers, the mounts, the stoppers and the push buttons of the seat according to the present disclosure, in which the pusher rotates to the position of the stopper.

Referring now to FIGS. 7 and 8, FIG. 7 is a perspective view showing the pushers 130, the mounts 140, the stoppers 150 and the push buttons 160 of the seat 100 according to the present disclosure, in which the pusher 130 rotates to a position different from the stopper 150. FIG. 8 is a perspective view showing the pushers 130, the mounts 140, the stoppers 150 and the push buttons 160 of the seat 100 according to the present disclosure, in which the pusher 130 rotates to the position of the stopper 150. The positional relationship among the pusher 130, the mount 140, the stopper 150 and the push button 160 of the present disclosure can be seen more clearly from FIGS. 7 and 8.

Figure 9A:
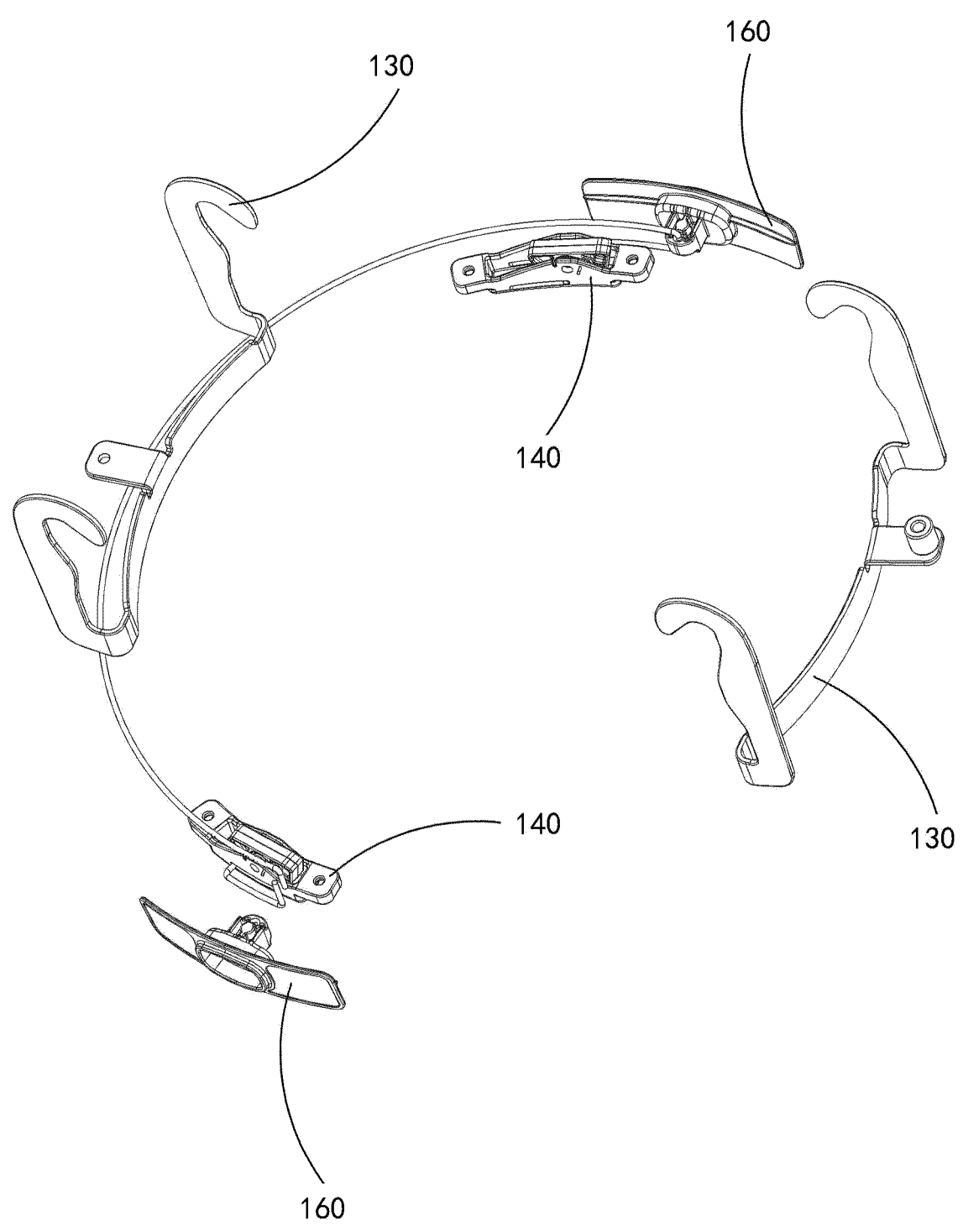
FIG. 9A is a perspective view showing the pushers, the mounts, the stoppers and the push buttons of the seat according to the present disclosure, in which one of the push buttons is in an exploded state.
Figure 9B:
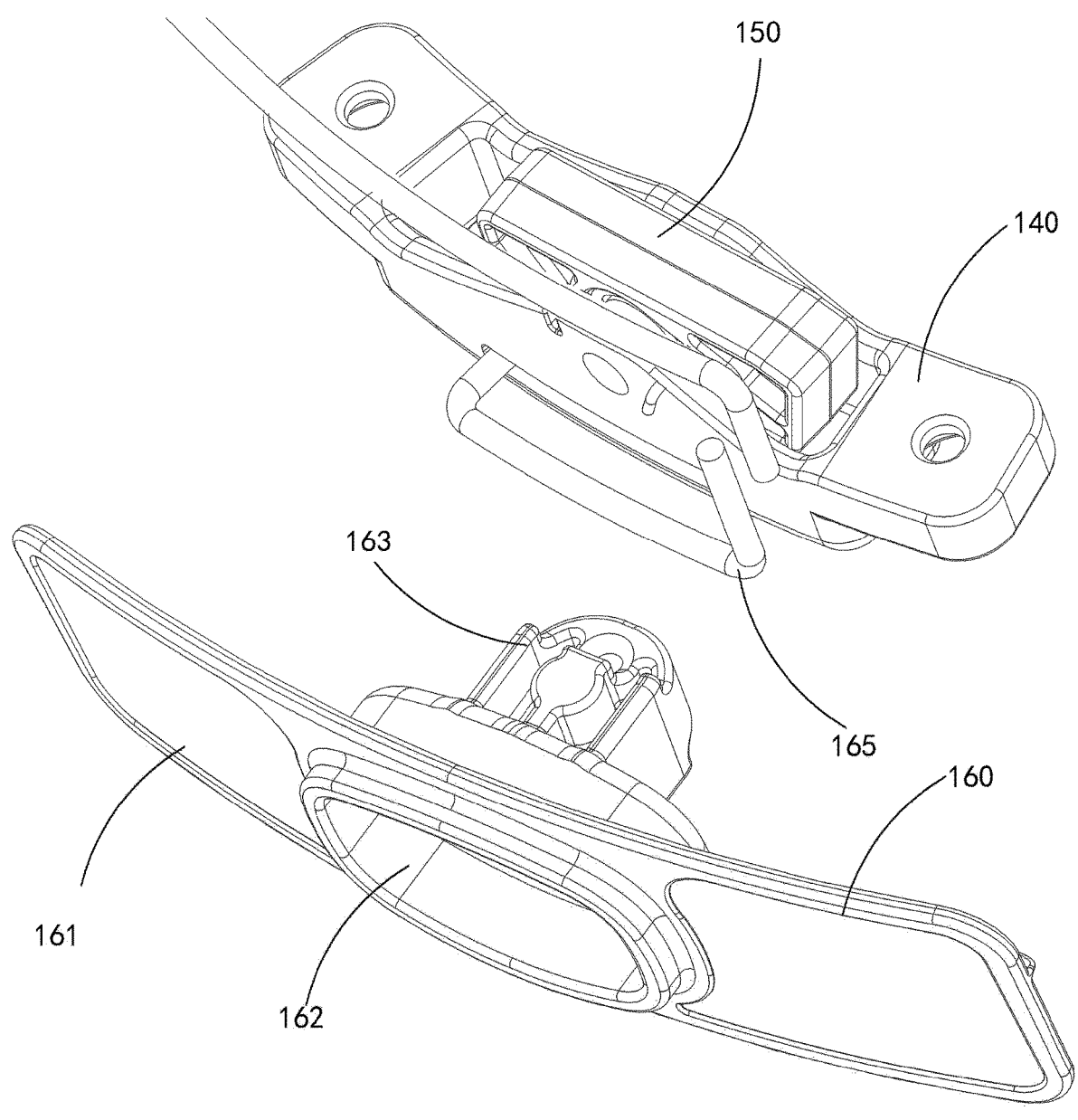
FIG. 9B is a partial enlarged view of FIG. 9A.

Referring now to FIGS. 9A and 9B, FIG. 9A is a perspective view showing the pushers 130, the mounts 140, the stoppers 150 and the push buttons 160 of the seat 100 according to the present disclosure, in which one of the push buttons 160 is in an exploded state; and FIG. 9B is a partial enlarged view of FIG. 9A.

As shown, the push button 160 includes: a push button plate 161, which is arc-shaped and extends along an inner wall of the base 120; a push button operating portion 162 protruding from a side of the push button plate 161; and a push button connecting portion 163 extending from the push button plate 161 towards a direction opposite to the push button operating portion 162, a plurality of insertion holes extending along a direction substantially perpendicular to the base 120 being provided on the push button connecting portion 163. The push button plate 161 is attached inside of the side wall of the base 120 when it is used, so that the push button 160 may slide along the side wall of the base 120 within a certain range. The push button operating portion 162 protrudes from an opening of the side wall of the base 120, so that the user may operate the push button 160. A connector 165 connected to the driving block 170 and a linkage 190 connected to another push button 160 are inserted into the insertion holes of the push button connecting portion 163, so that the connector 165 and the linkage 190 move together with the push button 160.

The connector 165 is a multi-segment extended folded-rod component, in which a plurality of extended segments sequentially include: a first segment extending along a direction substantially perpendicular to the base 120 and inserted into the push button 160; a second segment extending along a circumferential direction of the base 120 for connecting the first segment and a third segment; the third segment extending along a radial direction of the base 120, and inserted into the driving block 170 through an elongated slot 142 on the first side wall 141*a* and the second side wall 141*b* of the mount 140, so that the driving block 170 and the push button 160 may move together.

Figure 10A:
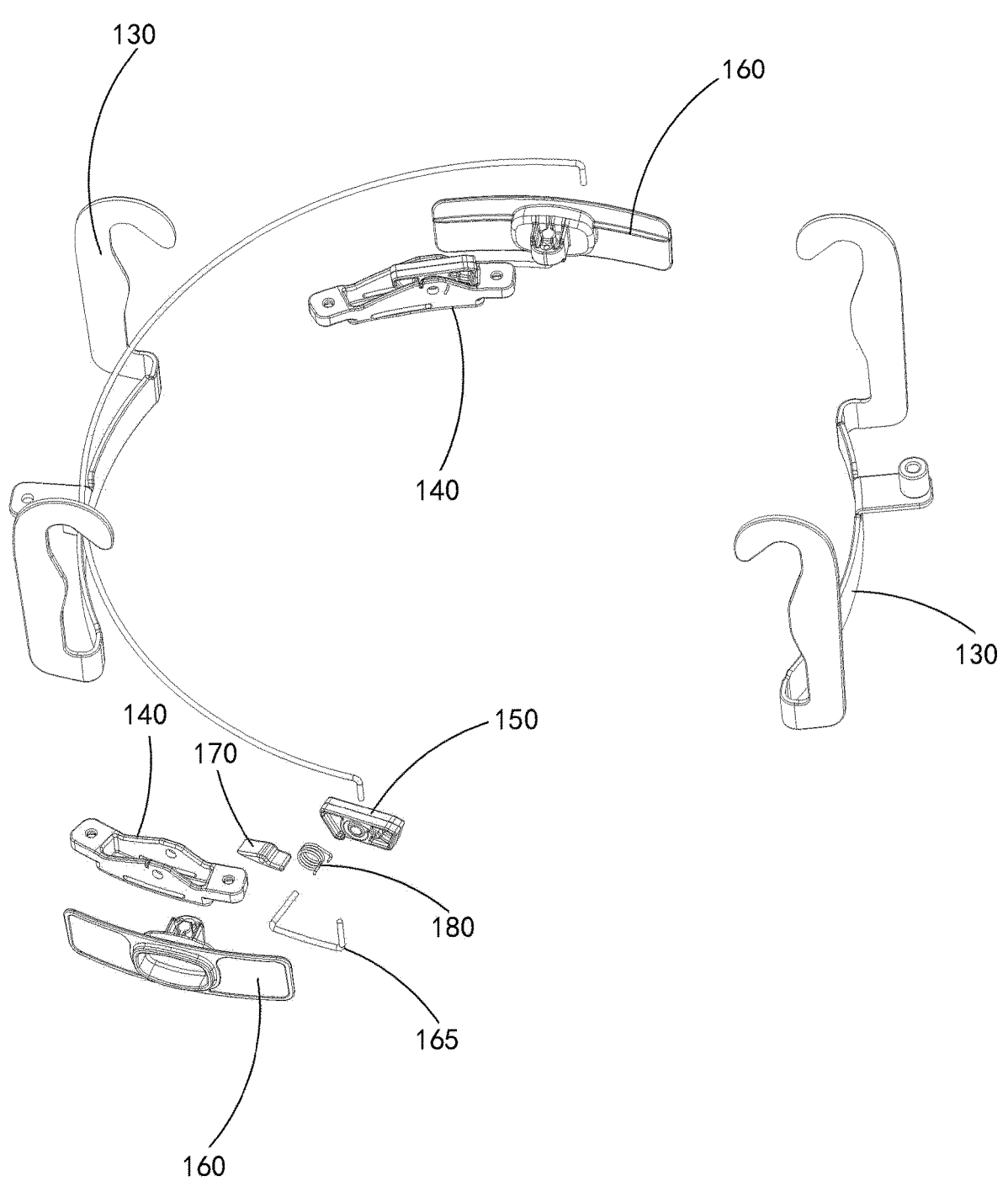
FIG. 10A is a perspective view showing the pushers, the mounts, the stoppers and the push buttons of the seat according to the present disclosure, in which the mount, the stopper and the push button at one side are in an exploded state.
Figure 10B:
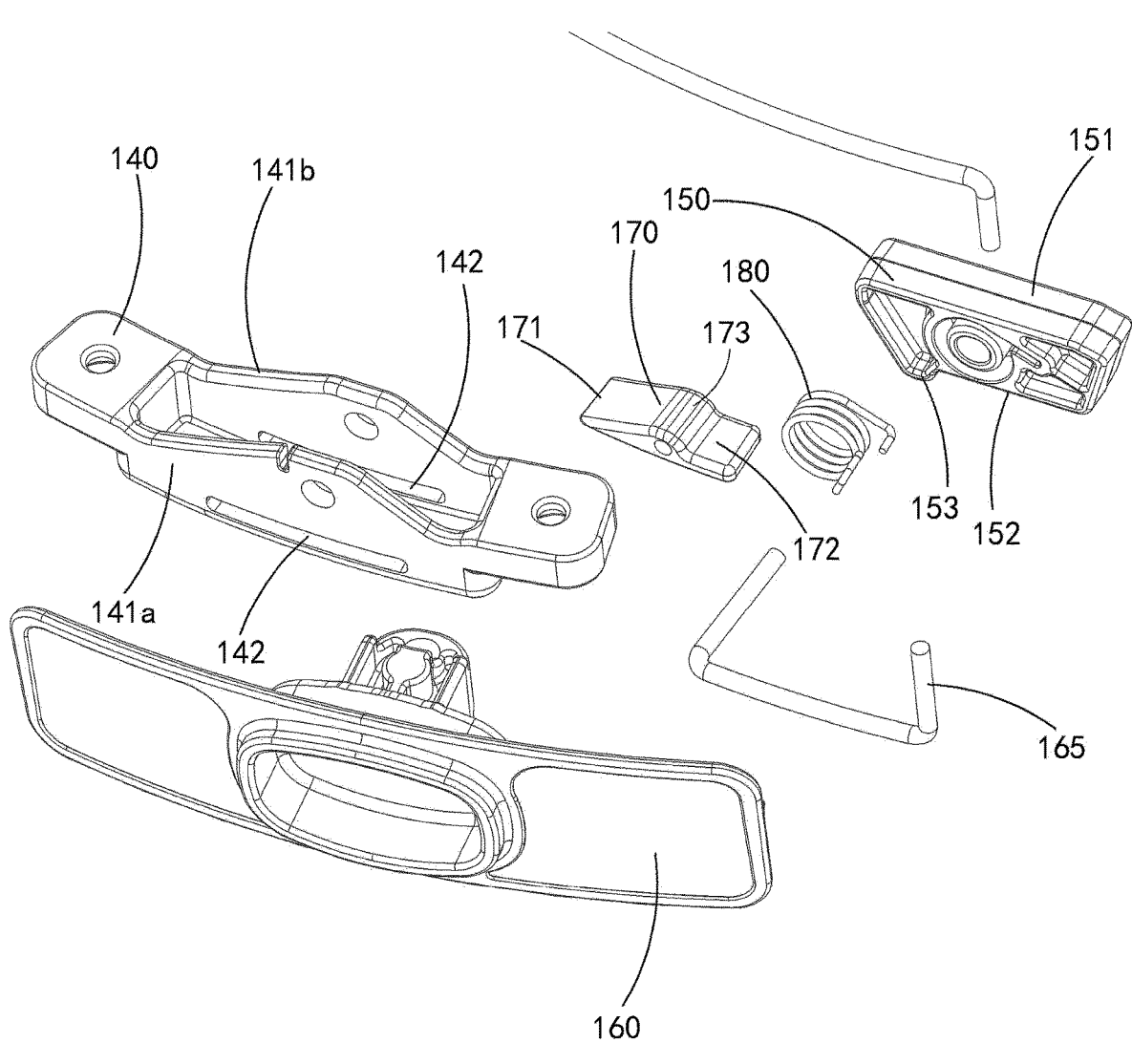
FIG. 10B is a partial enlarged view of FIG. 10A.

Referring now to FIGS. 10A and 10B, FIG. 10A is a perspective view showing the pushers 130, the mounts 140, the stoppers 150 and the push buttons 160 of the seat 100 according to the present disclosure, in which the mount 140, the stopper 150 and the push button 160 at one side are in an exploded state; and FIG. 10B is a partial enlarged view of FIG. 10A.

As shown, the mount 140 is generally box-shaped, having a bottom wall and first and second side walls 141*a* and 141*b* erected from both sides of the bottom wall, and also provided with mounting features such as bolt holes at both ends so as to be fixed to the base 120. Therefore, the mount 140 forms an accommodating space with one side open, so as to at least partially accommodate the driving block 170 and the stopper 150. The first side wall 141*a* and the second side wall 141*b* of the mount 140 are respectively provided with pivot holes, so that the stopper 150 may be pivotally assembled to the mount 140.

The driving block 170 is slidably disposed in the accommodating space of the mount 140 and slides along the bottom wall of the mount 140 and in the circumferential direction of the base 120. The driving block 170 has a first end 171 and a second end 172 along its sliding direction, and has a protrusion 173 between the first end 171 and the second end 172. In a height direction perpendicular to the sliding direction, the first end 171 has a gradually increasing height which obliquely transitions to the protrusion 173, and the second end 172 has a substantially uniform height lower than that of the protrusion 173. The driving block 170 is also provided with a driving block insertion hole, so that the connector 165 may be inserted into the driving block 170.

The stopper 150 includes a top surface 151 facing away from and approximately parallel to the bottom wall of the mount 140; and a bottom surface 152 facing towards and approximately parallel to the bottom wall of the mount 140. Among them, the bottom surface 152 of the stopper 150 is provided with a foot 153 which protrudes outwards, and the pushing assembly pivots the stopper 150 from the locking position to the releasing position by pushing the foot 153. A pivot hole is also provided in the stopper 150 along the radial direction of the base 120, and a pivot shaft (not shown) passes through the pivot hole on the first side wall 141*a* and the second side wall 141*b* of the mount 140 and the pivot hole in the stopper 150, so that the stopper 150 may be pivotally assembled to the mount 140.

A torsion spring 180 is also provided between the stopper 150 and the mount 140. The torsion spring 180 is provided around the pivot hole of the stopper 150, with one end abutting against the stopper 150 and the other end abutting against the mount 140 so as to bias the stopper 150 to the locking position (i.e., a position where the pusher 130 is prevented from moving).

It should be understood that, in this embodiment, the driving block 170, the push button 160 and the connector 165 are assembled together to form a pushing assembly, which may facilitate the assembly of the entire device for preventing mis-rotation. In other embodiments, the driving block 170, the push button 160 and the connector 165 may also be formed as an integral component.

Figure 11:
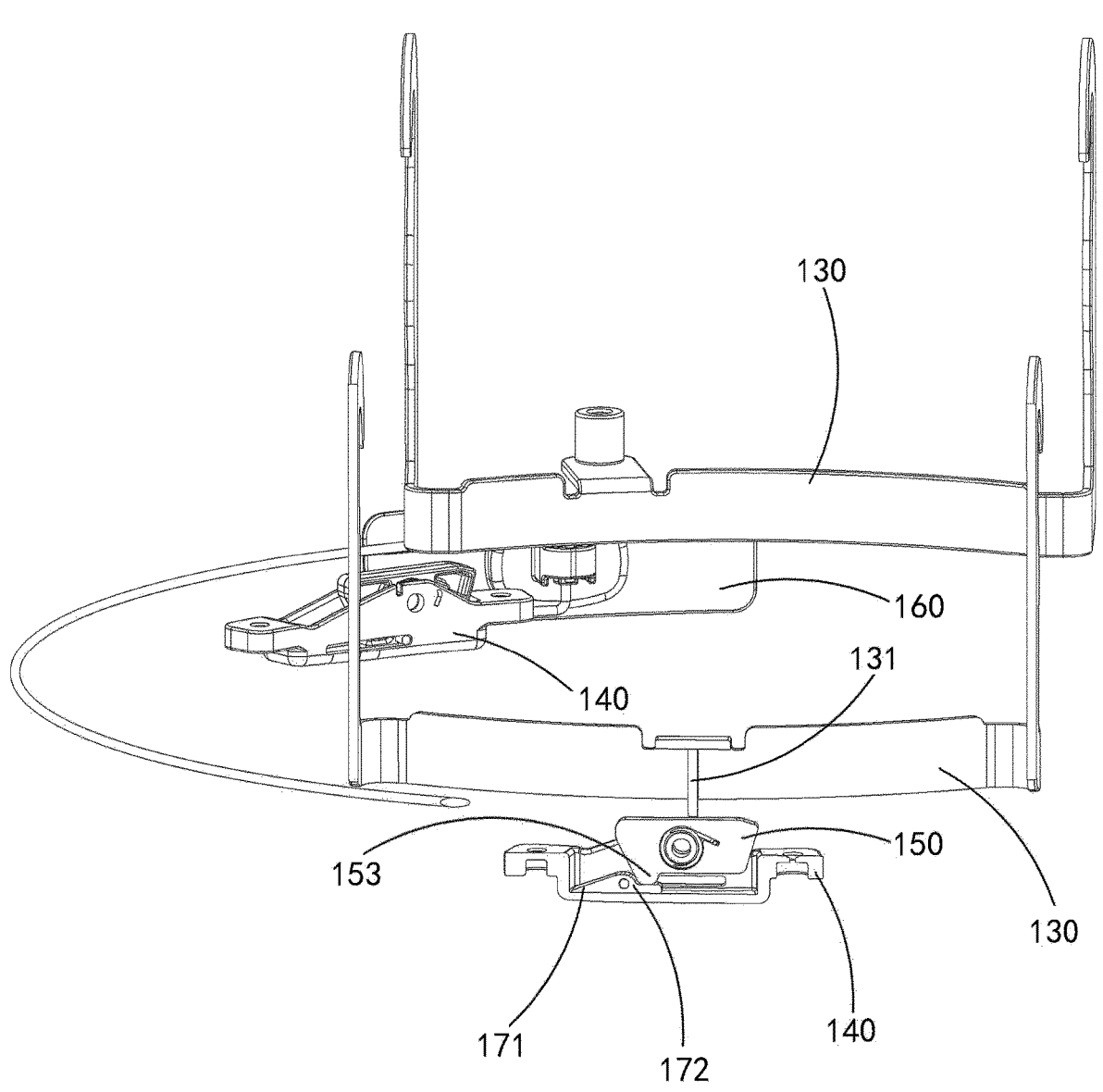
FIG. 11 is a perspective view showing the pushers, the mounts, the stoppers and the push buttons of the seat according to the present disclosure from an angle, in which the mount, the stopper and the push button at one side are shown in a sectional view, and the pusher is not blocked by the stopper.
Figure 12:
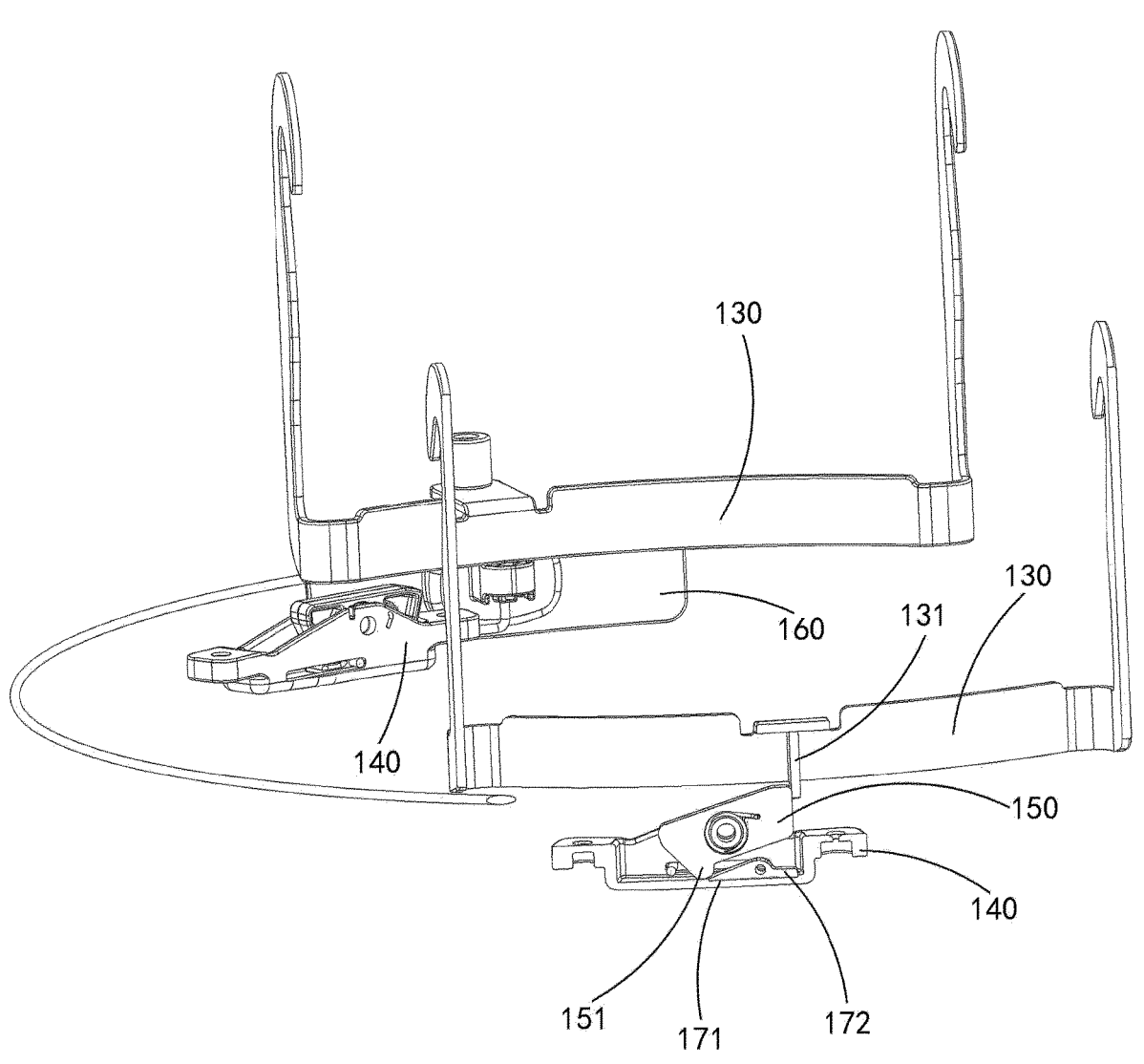
FIG. 12 is a perspective view showing the pushers, the mounts, the stoppers and the push buttons of the seat according to the present disclosure from another angle, in which the mount, the stopper and the push button at one side are shown in sectional view, and the pusher is blocked by the stopper.

The operation of the device for preventing mis-rotation of the present disclosure will be described with reference to FIGS. 11 and 12. FIG. 11 is a perspective view showing the pushers 130, the mounts 140, the stoppers 150 and the push buttons 160 of the seat 100 according to the present disclosure from an angle, in which the mount 140, the stopper 150, the push button 160 and other components at one side are shown in sectional view, and the pusher 130 is not blocked by the stopper 150. FIG. 12 is a perspective view showing the pushers 130, the mounts 140, the stoppers 150 and the push buttons 160 of the seat 100 according to the present disclosure from another angle, in which the mount 140, the stopper 150, the push button 160 and other components at one side are shown in sectional view, and the pusher 130 is blocked by the stopper 150.

In the releasing position shown in FIG. 11, the driving block 170 slides to the left in FIG. 11 in the accommodating space of the mount 140, so that the first end 171 of the driving block 170 abuts against the end wall of the mount 140. The foot 153 of the stopper 150 abuts against a uniform height segment (or flat segment) between the second end 172 of the driving block 170 and the protrusion 173, so that the top surface 151 of the stopper 150 is approximately parallel to the bottom wall of the mount 140. In this way, the stopper 150 does not prevent the pusher 130 from sliding along the annular rail.

When the user needs to lock the pusher 130 (and the seat body 110), the user operates the push button 160 to move to the right in the figure, so that the driving block 170 slides against a right end wall of the mount 140. In this process, the foot 153 of the stopper 150 climbs over the protrusion 173 through an inclined plane between the flat segment of the second end 172 of the driving block 170 and the protrusion 173, and then slides down along the inclined plane between the first end 171 of the driving block 170 and the protrusion 173 to abut against the bottom wall of the mount 140. At this time, the stopper 150 rotates relative to the mount 140, so that the top surface 151 of the stopper 150 is inclined relative to the bottom wall of the mount 140. Therefore, an end of the stopper 150 is lifted away from the mount 140, and interferes with the blocking portion 131 of the pusher 130, thus preventing the pusher 130 (and the seat body 110) from rotating.

In the embodiment shown, the stopper 150 is shown to block the rotation of the pusher 130 in one direction. It should be understood that, in other embodiments, the stopper 150 may be configured to block the rotation of the pusher 130 in both directions. For example, an end of the stopper 150 may be configured to have a notch corresponding to the blocking portion 131 of the pusher 130, so as to bidirectionally block the blocking portion 131.

Those skilled in the art will easily conceive of other embodiments of the present disclosure after considering the specification and practicing the present disclosure disclosed herein. The present disclosure is intended to cover any variations, uses or adaptations of the present disclosure, which follow the general principles of the present disclosure and include common knowledge or customary technical means in the art that are not disclosed in the present disclosure. The true scope and spirit of the present disclosure is indicated by the claims of the present disclosure.

Although the present disclosure has been described with reference to typical examples, the terminology used is illustrative and exemplary rather than limiting. Since the present disclosure may be implemented in various forms without departing from the spirit and essence of the present disclosure, it should be understood that the above-mentioned embodiments are not limited to any of the foregoing details, but should be interpreted as the broadest possible way within the scope defined by the claims, and therefore all changes that fall within the scope of the claims or their equivalents should be covered by the claims.

What is claimed is:

1. A device for preventing mis-rotation, connected between a first component and a second component which rotate with respect to each other, the device for preventing mis-rotation comprising:
   a blocking portion fixed on the first component;
   a mount fixed on the second component, the mount having a bottom wall, and a first side wall and a second side wall extending from the bottom wall to face each other, the bottom wall, the first side wall and the second side wall configured to form an accommodating space;
   a stopper pivotally arranged between the first side wall and the second side wall through a pivot shaft and at least partially accommodated in the accommodating space to pivot between a locking position in which the stopper is stopped at the blocking portion to prevent the first component from rotating relative to the second component in a rotating direction and a releasing position in which the stopper and the blocking portion are released to allow the first component to rotate relative to the second component in the rotating direction; and
   a pushing assembly arranged on the bottom wall of the mount and at least partially accommodated in the accommodating space, the pushing assembly being capable of sliding on the bottom wall under an action of external force, so as to pivot the stopper from the locking position to the releasing position, the pushing assembly comprising:
      a driving block slidably arranged in the accommodating space and positioned on the bottom wall of the mount;
      a push button positioned outside the accommodating space of the mount; and a connector fixedly connecting the driving block and the push button together.

2. The device for preventing mis-rotation of claim 1, further comprising:
   a torsion spring sleeved at the pivot shaft, wherein one end of torsion spring is fixed to the stopper and the other end of the torsion spring is fixed to the mount for biasing the stopper to the locking position.

3. The device for preventing mis-rotation of claim 1, wherein at least one of the first side wall and the second side wall of the mount is provided with an elongated slot along a sliding direction of the driving block, and
   the connector passes through the elongated slot to fixedly connect the driving block and the push button together, and is capable of sliding along the elongated slot.

4. The device for preventing mis-rotation of claim 3, wherein
   the driving block has a first end and a second end along the sliding direction, and has a protrusion between the first end and the second end;
   in a height direction perpendicular to the sliding direction, the first end has a gradually increasing height that obliquely transitions to the protrusion, and the second end has a substantially uniform height lower than that of the protrusion; and
   the connector is in a shape of a folded-rod, one end of which is inserted into the protrusion along a direction perpendicular to the sliding direction and the height direction, and the other end of which is fixed to the push button.

5. The device for preventing mis-rotation of any one of claims 3, and 4, wherein the stopper comprises:
   a top surface facing away from the bottom wall of the mount and approximately parallel to the bottom wall; and
   a bottom surface facing towards the bottom wall of the mount and approximately parallel to the bottom wall;
   wherein the bottom surface of the stopper is provided with a foot protruding outwards, and the pushing assembly pivots the stopper from the locking position to the releasing position by pushing the foot.

6. The device for preventing mis-rotation of claim 4, wherein the stopper comprises:
   a top surface facing away from the bottom wall of the mount and approximately parallel to the bottom wall;
   a bottom surface facing towards the bottom wall of the mount and approximately parallel to the bottom wall, in which a foot protruding outwards is arranged at an end of the bottom surface of the stopper; and
   two side surfaces positioned between the top surface and the bottom surface;
   wherein, in the releasing position, the driving block is positioned at an end of the elongated slot, the foot is positioned at the second end of the driving block, and the top surface of the driving block is opposite to the blocking portion;
   in the locking position, the driving block is positioned at the other end of the elongated slot, the foot is positioned at the first end of the driving block, and one of the two side surfaces of the stopper is clamped with and stopped at the blocking portion.

7. A seat comprising:
   a base comprising an annular rail which defines a sliding direction;
   a pusher connected to the base and slidably inserted in the annular rail;

a seat body fixedly connected with the pusher and capable of rotating with the pusher relative to the base; and the device for preventing mis-rotation of any one of claims 3, 4, and 6 installed between the base and the pusher, the first component being the pusher and the second component being the base.

8. The seat of claim 7, wherein the pusher comprises a pusher body capable of sliding on the annular rail, and the blocking portion is arranged on the pusher body and extends outward in a radial direction of the annular rail.

9. The seat of claim 7, wherein two devices for preventing mis-rotations are provided and respectively positioned at both sides of the base, and a toggle link is arranged between the two devices for preventing mis-rotations, so that when the pushing assembly of one of the two devices for preventing mis-rotations is operated, it drives the pushing assembly of the other of the two devices for preventing mis-rotations to operate synchronously.

10. A device for preventing mis-rotation, connected between a first component and a second component which rotate with respect to each other, the device for preventing mis-rotation comprising:

a blocking portion fixed on the first component;

a mount fixed on the second component, the mount having a bottom wall, and a first side wall and a second side wall extending from the bottom wall to face each other, the bottom wall, the first side wall and the second side wall configured to form an accommodating space;

a stopper pivotally arranged between the first side wall and the second side wall through a pivot shaft and at least partially accommodated in the accommodating space to pivot between a locking position in which the stopper is stopped at the blocking portion to prevent the first component from rotating relative to the second component in a rotating direction and a releasing position in which the stopper and the blocking portion are released to allow the first component to rotate relative to the second component in the rotating direction, the stopper comprising a top surface facing away from the bottom wall of the mount and a bottom surface facing towards the bottom wall of the mount; and a pushing assembly arranged on the bottom wall of the mount and at least partially accommodated in the accommodating space, the pushing assembly being capable of sliding on the bottom wall under an action of external force, so as to pivot the stopper from the locking position to the releasing position, wherein the bottom surface of the stopper is provided with a foot protruding outwards, and the pushing assembly pivots the stopper from the locking position to the releasing position by pushing the foot.

11. The device for preventing mis-rotation of claim 10, wherein:

the top surface of the stopper is approximately parallel to the bottom wall of the mount; and the bottom surface of the stopper is approximately parallel to the bottom wall of the mount.

* * * * *